(12) United States Patent
Bradley et al.

(10) Patent No.: US 7,519,819 B2
(45) Date of Patent: Apr. 14, 2009

(54) LAYERED SECURITY IN DIGITAL WATERMARKING

(75) Inventors: Brett Alan Bradley, Portland, OR (US); Brett T. Hannigan, Portland, OR (US); John Kennedy Barr, Tigard, OR (US)

(73) Assignee: Digimarc Corporatino, Beaverton, OR (US)

( * ) Notice: Subject to any disclaimer, the term of this patent is extended or adjusted under 35 U.S.C. 154(b) by 1314 days.

(21) Appl. No.: 10/158,385

(22) Filed: May 29, 2002

(65) Prior Publication Data

US 2003/0223584 A1 Dec. 4, 2003

(51) Int. Cl.
- *H04L 9/00* (2006.01)
- *H04N 7/167* (2006.01)
- *G06K 9/00* (2006.01)
- *G06K 9/46* (2006.01)
- *G06K 15/00* (2006.01)
- *G07F 7/12* (2006.01)

(52) U.S. Cl. .................. 713/176; 713/170; 713/180; 713/181; 380/217; 380/28; 382/100; 382/232; 340/5.86; 358/3.28

(58) Field of Classification Search ........... 713/176, 713/187, 194, 200; 382/100, 232; 340/5.86
See application file for complete search history.

(56) References Cited

U.S. PATENT DOCUMENTS

| | | |
|---|---|---|
| 5,499,294 A | 3/1996 | Friedman |
| 5,617,119 A | 4/1997 | Briggs et al. |
| 5,646,997 A | 7/1997 | Barton |
| 5,664,018 A | 9/1997 | Leighton |
| 5,721,788 A | 2/1998 | Powell et al. |
| 5,740,244 A | 4/1998 | Indeck et al. |
| 5,768,426 A | 6/1998 | Rhoads |
| 5,825,892 A | 10/1998 | Braudaway et al. |
| 5,841,886 A | 11/1998 | Rhoads |
| 5,889,868 A * | 3/1999 | Moskowitz et al. ......... 713/176 |

(Continued)

FOREIGN PATENT DOCUMENTS

EP  0493091  7/1992

(Continued)

OTHER PUBLICATIONS

Memon et al, Protecting digital media content, 1998, Association for Computing Machinery, pp. 34-43.*

(Continued)

*Primary Examiner*—Christopher A Revak
*Assistant Examiner*—Aravind K Moorthy

(57) ABSTRACT

A media object authentication system uses layers of security features based on digital watermarks embedded in media objects. The system generates a first digital watermark with a message payload carrying data about the object, such as a hash of text data printed on the object. The first digital watermark is combined with a content signature derived from features of the media object, such as frequency domain attributes, edge attributes, or other filtered version of the media signal (e.g., image photo on a secure document) on the media object. This combination forms a new digital watermark signal that is embedded in the host media object. To verify the object, the digital watermark payload is extracted and compared with the data about the object. The combined digital watermark and content signature is also evaluated to authenticate the media signal on the media object.

30 Claims, 2 Drawing Sheets

U.S. PATENT DOCUMENTS

| | | | |
|---|---|---|---|
| 5,933,798 A | 8/1999 | Linnartz | |
| 5,951,055 A | 9/1999 | Mowry, Jr. | |
| 5,974,548 A | 10/1999 | Adams | |
| 6,064,764 A * | 5/2000 | Bhaskaran et al. | 382/183 |
| 6,065,119 A | 5/2000 | Sandford, II et al. | |
| 6,101,602 A | 8/2000 | Fridrich | |
| 6,104,812 A | 8/2000 | Koltai et al. | |
| 6,131,162 A | 10/2000 | Yoshiura et al. | |
| 6,205,249 B1 * | 3/2001 | Moskowitz | 382/232 |
| 6,209,092 B1 | 3/2001 | Linnartz | |
| 6,233,347 B1 | 5/2001 | Chen et al. | |
| 6,233,684 B1 | 5/2001 | Stefik et al. | |
| 6,240,121 B1 | 5/2001 | Senoh | |
| 6,243,480 B1 * | 6/2001 | Zhao et al. | 382/100 |
| 6,246,777 B1 | 6/2001 | Agarwal et al. | |
| 6,272,634 B1 | 8/2001 | Tewfik et al. | |
| 6,275,599 B1 | 8/2001 | Adler et al. | |
| 6,285,775 B1 | 9/2001 | Wu et al. | |
| 6,286,761 B1 | 9/2001 | Wen | |
| 6,332,031 B1 | 12/2001 | Rhoads et al. | |
| 6,389,151 B1 | 5/2002 | Carr et al. | |
| 6,425,081 B1 * | 7/2002 | Iwamura | 713/176 |
| 6,487,301 B1 * | 11/2002 | Zhao | 382/100 |
| 6,496,933 B1 | 12/2002 | Nunally | |
| 6,512,837 B1 | 1/2003 | Ahmed | |
| 6,533,385 B1 | 3/2003 | Mackay et al. | |
| 6,546,112 B1 | 4/2003 | Rhoads | |
| 6,574,350 B1 | 6/2003 | Rhoads et al. | |
| 6,597,745 B1 * | 7/2003 | Dowling | 375/296 |
| 6,611,599 B2 * | 8/2003 | Natarajan | 380/203 |
| 6,611,607 B1 | 8/2003 | Davis et al. | |
| 6,614,914 B1 | 9/2003 | Rhoads et al. | |
| 6,636,615 B1 | 10/2003 | Rhoads et al. | |
| 6,671,407 B1 * | 12/2003 | Venkatesan et al. | 382/232 |
| 6,683,966 B1 | 1/2004 | Tian et al. | |
| 6,694,041 B1 | 2/2004 | Brunk | |
| 6,714,683 B1 | 3/2004 | Tian et al. | |
| 6,748,533 B1 * | 6/2004 | Wu et al. | 713/176 |
| 6,751,336 B2 * | 6/2004 | Zhao | 382/100 |
| 6,757,406 B2 * | 6/2004 | Rhoads | 382/100 |
| 6,776,438 B2 * | 8/2004 | Lee | 283/82 |
| 6,778,682 B2 * | 8/2004 | Rhoads | 382/100 |
| 6,779,024 B2 * | 8/2004 | DeLaHuerga | 709/217 |
| 6,782,116 B1 * | 8/2004 | Zhao et al. | 382/100 |
| 6,785,815 B1 * | 8/2004 | Serret-Avila et al. | 713/176 |
| 6,788,800 B1 | 9/2004 | Carr et al. | |
| 6,804,373 B1 * | 10/2004 | Tresser et al. | 382/100 |
| 7,366,908 B2 * | 4/2008 | Tewfik | 713/176 |
| 2001/0008557 A1 | 7/2001 | Stefik et al. | |
| 2001/0024510 A1 | 9/2001 | Iwamura | |
| 2001/0055390 A1 | 12/2001 | Hayashi et al. | |
| 2001/0056410 A1 | 12/2001 | Ishigaki | |
| 2002/0016916 A1 | 2/2002 | Natarajan | |
| 2002/0021824 A1 | 2/2002 | Reed et al. | |
| 2002/0030907 A1 | 3/2002 | Ikeda et al. | |
| 2002/0031240 A1 | 3/2002 | Levy et al. | |
| 2002/0037093 A1 | 3/2002 | Murphy | |
| 2002/0049908 A1 | 4/2002 | Shimosato et al. | |
| 2002/0054355 A1 | 5/2002 | Brunk | |
| 2002/0061121 A1 | 5/2002 | Rhoads et al. | |
| 2002/0064298 A1 | 5/2002 | Rhoads et al. | |
| 2002/0067844 A1 | 6/2002 | Reed et al. | |
| 2002/0076048 A1 | 6/2002 | Hars | |
| 2002/0076082 A1 | 6/2002 | Arimura et al. | |
| 2002/0095577 A1 | 7/2002 | Nakamura et al. | |
| 2002/0096562 A1 | 7/2002 | Lewis | |
| 2002/0099943 A1 | 7/2002 | Rodriguez et al. | |
| 2002/0105665 A1 | 8/2002 | Wasilewski et al. | |
| 2002/0105679 A1 | 8/2002 | Haynes | |
| 2002/0116509 A1 | 8/2002 | DeLaHuerga | |
| 2002/0150241 A1 * | 10/2002 | Scheidt et al. | 380/44 |
| 2002/0176114 A1 | 11/2002 | Zeller et al. | |
| 2002/0184505 A1 | 12/2002 | Mihcak et al. | |
| 2002/0199106 A1 | 12/2002 | Hayashi | |
| 2003/0011684 A1 | 1/2003 | Narayanaswami et al. | |
| 2003/0088774 A1 * | 5/2003 | Hars | 713/176 |
| 2003/0099374 A1 | 5/2003 | Choi et al. | |
| 2003/0159043 A1 * | 8/2003 | Epstein | 713/176 |
| 2003/0161470 A1 | 8/2003 | Shin et al. | |

FOREIGN PATENT DOCUMENTS

| | | |
|---|---|---|
| EP | 0629972 | 12/1994 |
| EP | 838050 | 4/1998 |
| EP | 996278 A1 * | 4/2000 |
| EP | 1 041 815 | 10/2000 |
| EP | 1096429 | 5/2001 |
| EP | 1173001 | 1/2002 |
| EP | 1209897 | 5/2002 |
| GB | 2362240 | 11/2001 |
| WO | WO0062258 | 10/2000 |
| WO | WO0172030 | 9/2001 |
| WO | WO 01/73997 | 10/2001 |
| WO | WO0173997 | 10/2001 |
| WO | WO 02/37309 | 5/2002 |
| WO | WO 02/056264 | 7/2002 |
| WO | WO 02/059712 | 8/2002 |
| WO | WO 2005060152 A1 * | 6/2005 |

OTHER PUBLICATIONS

Barreto et al, Toward secure public-key blockwise fragile authentication watermarking, 2002, IEEE, pp. 57-62.*

Chai Wah Wu, On the Design of Content-BAsed Multimedia Authentication Systems, 2002, IEEE, pp. 385-393.*

Lefebvre et al, A Robust Soft hash Algorithm for Digital Image Signature, 2003, IEEE, pp. 495-498.*

Fridrich, "Visual Hash for Oblivious Watermarking," Proc. SPIE Security and Watermarking of Multimedia Contents, pp. 286-294, Jan. 2000.

Schneider, "A Robust Content Based Digital Signature for Image Authentication," Proc. IEEE Int. Conf. on Image Processing (vol. III), Sep. 1996, pp. 227-230.

Mobasseri et al, "Content-dependent video authentication by self-watermarking in color space," SPIE, Security and Watermarking of Multimedia Contents III, vol. 4314, pp. 35-44, Jan. 2001.

Liu et al, "Content-based watermarking model," Proc. 15th Int'l Conf on Pattern Recognition, ICPR-2000, vol. 4, pp. 238-241, Sep. 2000.

Queluz et al, "Spatial watermark for image verification," SPIE, Security and Watermarking of Multimedia Contents II, vol. 3971, pp. 120-130, Jan. 2000.

U.S. Appl. No. 60/180,364, Davis et al., filed Feb. 4, 2000.

U.S. Appl. No. 60/198,138, Alattar, filed Apr. 17, 2000.

U.S. Appl. No. 60/198,857, Davis et al., filed Apr. 21, 2000.

Bassali et al., "Compression Tolerant Watermarking for Image Verification," IEEE Proc. Int. Conf. on Image Processing, vol. 1, Sep. 2000 pp. 434-437.

Bender et al., Applications for Data Hiding, IBM Systems Journal, vol. 39, Nos. 384, 2000, pp. 547-568.

Braudaway et al., "Application of Invisible Image Watermarks to Produce Remotely Printed, Duplication Resistant, and Demonstrably Authentic Documents," Proc. SPIE-Int. Soc. Opt. Eng. vol. 4314, pp. 351-359.

Communication of Postal Information Using Two-Dimensional Symbols, Draft Under Implementation, Mar. 19, 1998, 21 pages.

Dittmann et al., "Content-based Digital Signature for Motion Pictures Authentication and Content-Fragile Watermarking," IEEE Proc. Int. Conf. on Multimedia Computing and Systems, Jun. 1999, pp. 209-213.

Dittmann, "Chapter 3: Telltale Watermarking," In Multiresolution Digital Watermarking: Algorithms and Implications for Multimedia Signals, Ph.D. thesis at Univ. of Toronto, 1999, pp. 23-52.

Frequently Asked Questions, Epson Image Authentication System (IAS), Oct. 5, 1999, 3 pages.

Friedman, "The Trustworthy Digital Camera: Restoring Credibility to the Photograpic Image," IEEE Trans. Consumer Electronic vol. 39, No. 4, Nov. 1983, pp. 905-910.

Lin et al., "Generating Robust Digital Signature for Image/Video Authentication," Proc. Multimedia and Security Workshop at ACM Multimedia'98, Sep. 1998, pp. 49-54.

Lamy et al., "Content-Based Watermarking for Image Authentication," Proc. 3.sup.rd Int. Workshop on Information Hiding, Sep./Oct. 1999, pp. 187-1898.

Lin et al., "Issues and Solutions for Authenticating MPEG Video," Proc. SPIE vol. 3657: Security and Watermarking of Multimedia Contents, Jan. 1999, pp. 54-65.

Matthews, "When Seeing is not Believing," New Scientist, No. 1895, Oct. 16, 1993, pp. 13-15.

NCITS-WI 990124 IS 13660 Proof, 1997, 30 pages.

Queluz et al., "Spatial Watermark for Image Verification," Proc. SPIE vol. 3971: Security and Watermarking of Multimedia Contents II, Jan. 2000, pp. 120-130.

Rey et al., "Blind Detection of Malicious Alterations on Still Images using Robust Watermarks," Proc. IEE Seminar on Secure Images and Image Authentication, Apr. 2000, pp. 7/1-7/6.

Sun et al., "VQ-based digital signature scheme for multimedia content authentication," Proc. SPIE vol. 3971: Security and watermarking of Multimedia Contents II, Jan. 2000, pp. 404-416.

Szepanski, "A Signal Theoretic Method for Creating Forgery-Proof Documents for Automatic Verification," Proc. IEEE 1979 Carnahan Conf. on Crime Countermeasures, May 1979, pp. 101-109.

Tian, "Wavelet-Based Reversible Watermarking for Authentication," Proc. SPIE—Int. Soc. Opt. Eng., vol. 4675, 2002, pp. 679-690.

Tian, "Wavelet-Based Image Compression and Content Authentication," Oct. 22, 2001, Proc. SPIE Int. Soc. Opt. Eng, vol. 4551, pp. 11-20.

van Schyndel et al., "Towards a Robust Digital Watermark," Second Asia Conf. on Computer Vision, Dec. 5, 1995, pp. 504-508.

Walton, "Image Authentication for a Slippery New Age," Dr. Dobb's Journal, Apr. 1995, pp. 18-20, 22, 24, 26, 82, and 84-87.

Wu et al., "Data Hiding in Digital Binary Image," 2000 IEEE, pp. 393-396.

Xie et al., "Secure MPEG Video Communications by Watermarking," Proc. Conf of ATIRP (Advanced Telecommuniciations and Information Distribution Research Panel), Feb. 1999, pp. 459-462.

Xie et al., "Methods for Soft Image/Video Authentication," Proc. Conf. of ATIRP (Advanced Telecommunications and Informatio Distribution Research Project), Mar. 2000, 5 pages.

Yeung et al., "An Invsible Watermarking Technique for Image Verification," Proc. Int. Conf. on Image Processing, vol. 1, pp. 680-683, Oct. 1997.

Yeung et al., "Digital Watermarks: Shedding Light on the Invisible," 1998 IEEE, pp. 32-41.

* cited by examiner

LAYERED SECURITY IN DIGITAL WATERMARKING

TECHNICAL FIELD

The invention relates to digital watermarking and authentication of media objects.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's application Ser. No. 09/503,881 (now U.S. Pat. No. 6,614,914) and U.S. Pat. No. 6,122,403, which are hereby incorporated by reference.

One application of digital watermarking is for the authentication of physical and electronic media objects, like images, video, audio, and printed media. There are a variety of ways to authenticate these objects. One way is to embed a predetermined watermark in the object. If a reader detects this watermark in an object, then the detection of the watermark is an indicator of its authenticity.

Another way to authenticate the object is to embed information about the object or the bearer of the object (e.g., in photo ID or other secure documents). If the reader extracts this information from the watermark, and it matches information on the object or about the bearer, then the comparison this information is an indicator that object is authentic and/or the bearer of the object is valid.

To undermine the authentication function of the digital watermark, a hacker might try to re-create the watermark in a fake media object.

The invention provides a method for authenticating electronic or physical media objects using digital watermarks.

One aspect of the invention is a method for creating a media object for authentication. This method computes a hash of information on the object, and generates a pattern from the hash. It also computes a content signature from a media signal in the media object. It then combines the content signature and the pattern to form a content dependent pattern. Finally, the method embeds the content dependent pattern as a digital watermark into the media object.

One specific application of this method is to create secure documents that may be authenticated automatically. For example, the media object may comprise a photo ID or other secure document, where the hash is computed from data on the document and the content signature is derived from features of the photo or other image on the document. The method applies to other physical and electronic media objects. The hash may be computed from information in the media object, which is easily interpreted by a viewer or listener of the rendered object, or may be computed from information relating to the media object.

Another aspect of the invention is a related method of authenticating a media object using a digital watermark embedded in the media object. This authentication method providing a first pattern, either from an external source (e.g., user input, system memory, etc.) or derived from a digital watermark embedded in the object. The method also derives a content dependent signature from a media signal in the media object. It then combines the content dependent signature and the first pattern to form a content dependent pattern. Finally, it measures the content dependent pattern embedded as a digital watermark in the media signal to provide a measurement of authenticity of the media signal.

Further features will become apparent with reference to the following detailed description and accompanying drawings.

DETAILED DESCRIPTION

Figure 1:
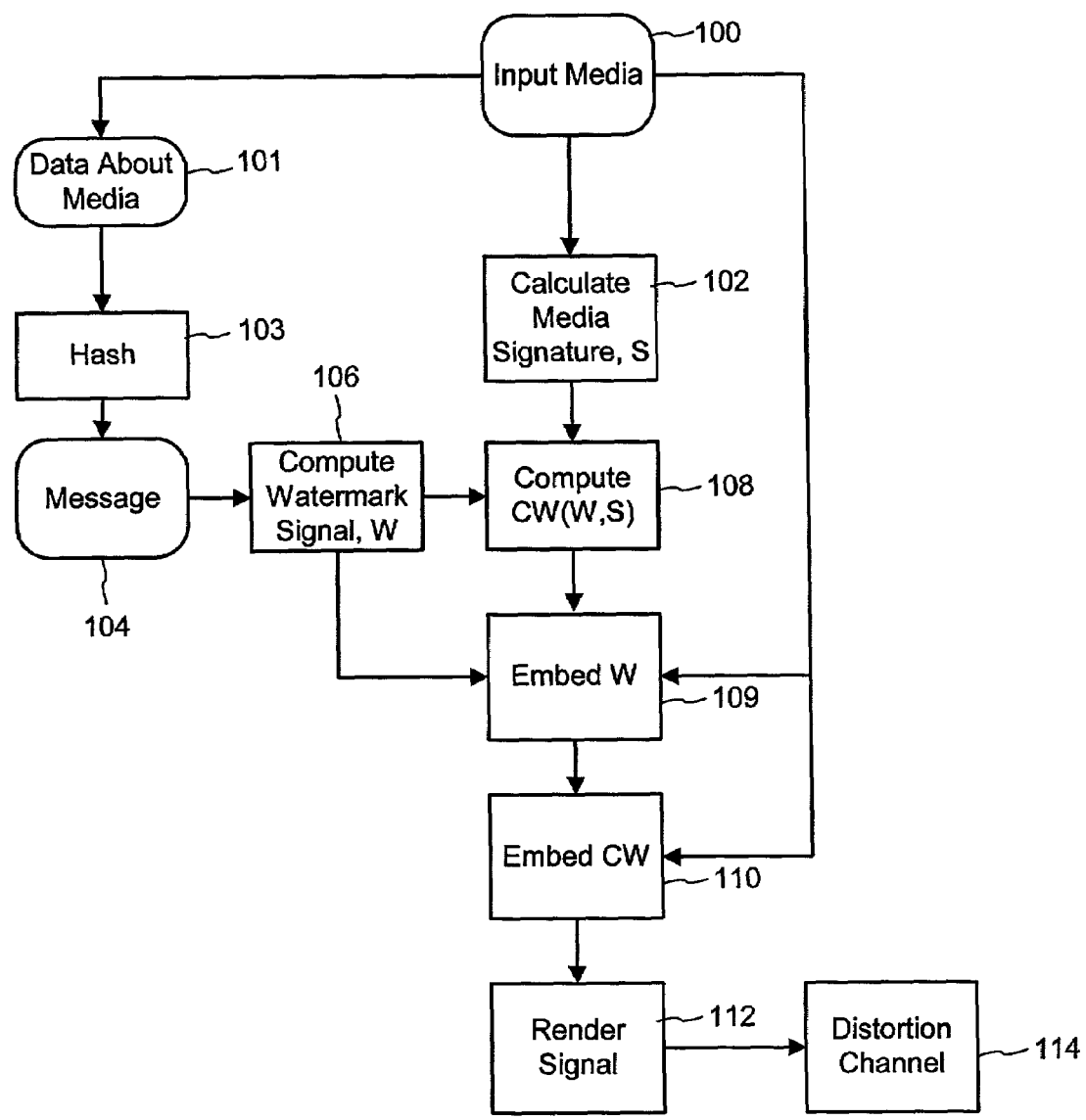
FIG. 1 is a diagram illustrating a digital watermarking embedder used to create watermarked objects that are authenticated in multiple ways.

FIG. 1 is a diagram illustrating a digital watermarking embedder used to create watermarked objects that are authenticated in multiple ways. This diagram shows a variety of techniques to provide layers of security in a media object. The implementer may choose to use one or more combinations of the elements illustrated in the diagram, such as a hash carried in a watermark, a content dependent watermark, a content signature carried in a watermark, etc. We will illustrate how these functions of the digital watermark may be integrated into a single watermark or in separate digital watermarks. While the media object generally encompasses images, video, audio, and physical objects, we illustrate the method through the use of examples of security documents that carry images embedded with digital watermarks.

As shown in FIG. 1, the input to the embedder is an input media signal 100. In our example of a security document, this input signal corresponds to an image to be printed on the security document.

Figure 2:
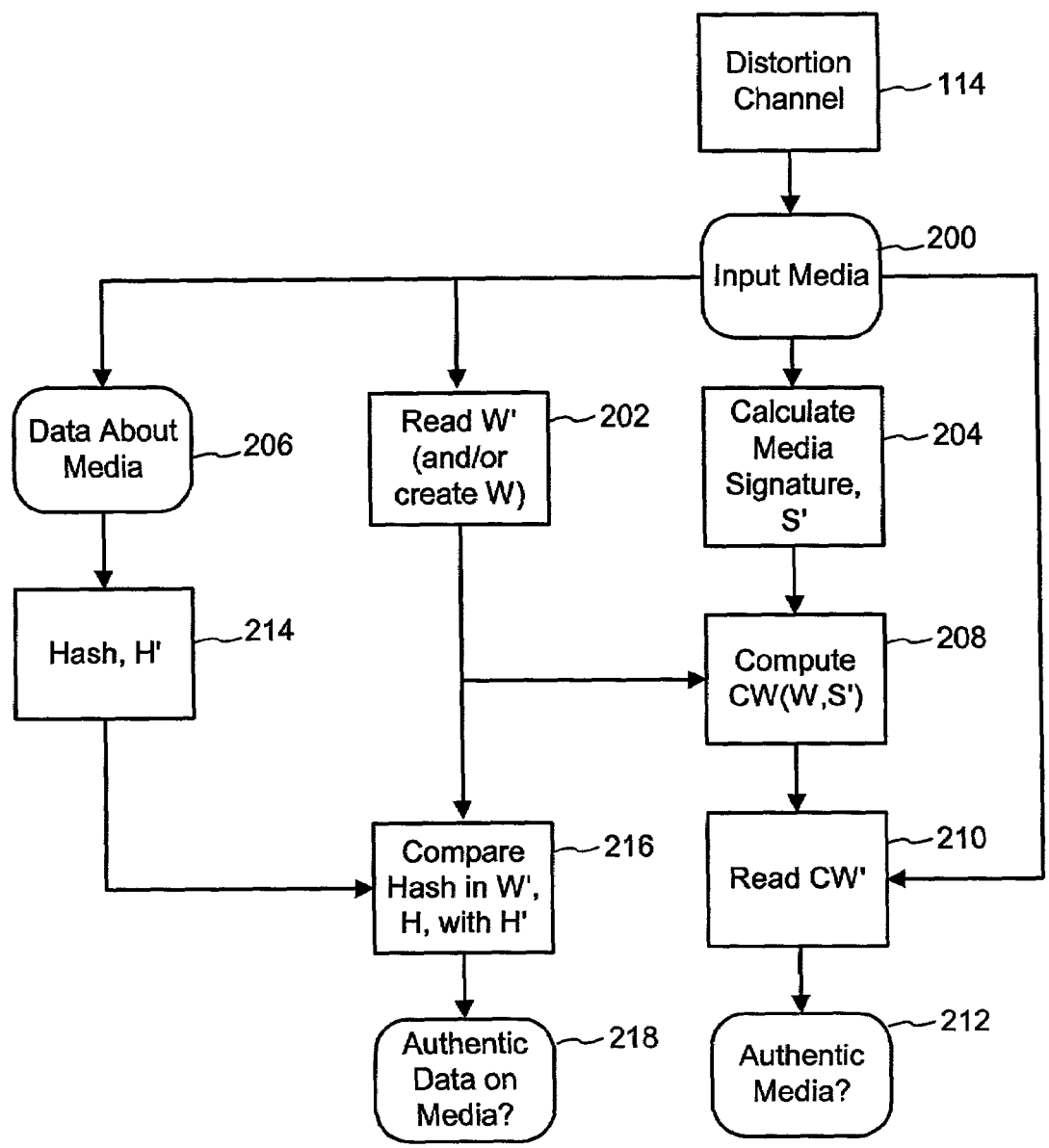
FIG. 2 is a diagram illustrating a method for authenticating media objects created using the method shown in FIG. 1.

The embedder computes a signature of the media object (102) by calculating a set of features of the media signal in the media object. Preferably, the features are selected such that they are likely to be relatively unchanged through a distortion channel that the object is expected to pass through. In the example of a security document, this distortion channel includes printing, scanning (to capture a digital image for authentication as shown in FIG. 2), normal wear and tear, soiling, geometric distortion, etc. The features and robustness of the digital watermarks may be adapted to survive or degrade in response to distortions that result from intentional manipulation. For example, if an intentional manipulation occurs, such as scanning and re-printing of a security document on a desktop scanner/printer, this manipulation may render the feature severely distorted and/or the digital watermark un-readable, which serve as indicators that the document is a fake. A plurality of digital watermarks and signal feature metrics may be used to measure evidence of such manipulation. These metrics may be used along with robust digital watermarks that carry additional authentication information as described below.

Examples of features from which the signature are derived for an image include: edge pixels detected using an edge detection filter, frequency coefficients (e.g., low frequency coefficients of blocks in the image), relationships among neighboring pixels (e.g., differences between neighboring pixel values, computed using a filter that returns the difference or sign of the difference between a pixel and the average of its neighbors), etc. In one implementation, we use these features to generate a binary antipodal signal of [1, −1] corresponding to locations within the signal to be watermarked. The antipodal signal is a vector where the elements having a value of 1 represent a location of the feature (or location where feature meets a criteria, such as above a threshold, local maxima/minima), while the −1 represents absence of the feature (or location where the feature does not meet the criteria).

The antipodal signal can be used to embed features of the host input signal into the digital watermark, such as selected low frequency coefficients. In one implementation, for example, the embedder calculates the signature by taking a frequency transform (e.g., a Discrete Cosine Transform) of an M by M block of the host image signal, and then quantizing the lowest frequency N by N coefficients (except DC) to 1 or −1 by performing a threshold comparison with their median value (greater than median assigned to 1, and less than median assigned to −1). This results in a binary antipodal signature of length (N×N−1), whose elements are mapped to the M×M locations in the original M by M block. Note that N is less than M, so the elements of the signature are redundantly mapped to the M×M samples in the M by M block. A similar procedure is repeated for other M by M blocks of the host media signal.

Next, the embedder computes a content dependent watermark, CW, as a function of the signature and a basic watermark pattern, W (108). Like the signature, this basic watermark pattern is also a binary antipodal signal in our implementation. The embedder generates CW by performing a pointwise multiplication of W and CW. Other functions may be used to generate CW from W and S, and the resulting signal need not be a binary antipodal signal.

As shown in FIG. 1, the basic pattern, W, can also serve as an additional security layer. In particular, the basic pattern may be used to carry information about the media or an entity associated with the media, such as its owner, the bearer of a security document, etc. In the specific case of a security document, the system includes an OCR reader to capture text information carried on the document about the bearer, such as name, birthdate, address, ID number, etc. In the embedder of FIG. 1, this data about the media object (101) is input to a hash function (103), which generates a hash. For example, in our secure document example, this text information is input to a hash function, such as a CRC or secure hash, like MD5, SHA, etc This hash then forms part of a digital watermark payload message (104).

The embedder converts the payload into the basic pattern (106). The process of generating a basic pattern from the payload can be implemented in a variety of ways, and depends in part on the message coding process compatible with the digital watermark embedder. For example, some digital watermark embedders operate on binary signals, while others operate on M-ary symbols. One approach is to apply repetition and error correction coding to generate an intermediate signal from the payload, then spread the intermediate signal over a binary antipodal carrier signal using binary or M-ary spread spectrum modulation. The result is a binary antipodal signal that carries the payload and is mapped to locations within the host media object.

The basic pattern may be integrated with a calibration signal or used in conjunction with a separate calibration watermark to compensate for geometric/temporal distortion such as geometric/temporal scaling, shear, rotation, shifting, cropping, etc. For example, the carrier, in one implementation, is formed into a pattern that has a certain set of transform domain peaks that enable geometric synchronization by performing pattern matching between the peaks and a reference signal.

In one implementation, the embedder separately embeds the basic pattern and the content dependent watermark using separate digital watermark embedding operations 109, 110. One example for a secure document is where the basic pattern is embedded by modifying host image pixels at a first resolution up or down according to the sign of the corresponding binary antipodal signal element. The content dependent pattern is then embedded similarly, but at a different spatial resolution. Both the basic pattern and the content dependent pattern are embedded throughout the image and overlap. In an alternative example, the basic and content dependent patterns are embedded at the same spatial resolution, but at mutually exclusive spatial locations (e.g., in interleaved pixel blocks). In general, the two watermarks are layered so as to minimize their interference; this can be achieved by embedding in discrete spatial or transform domain features, locations, etc. As opposed to a simple binary quantization of a host signal value up or down, the host signal values or features corresponding to the watermark elements may be quantized to pre-determined bins or levels that adapt to host signal characteristics corresponding to the watermark element value. Also, the watermark embedders may employ additional perceptual modeling to control the amount of variation to the host signal based on data hiding attributes of the host signal as measured using Human Perceptual Modeling.

In another implementation, the embedder embeds only the content dependent watermark (110), and it serves the dual function of binding the watermark to the host signal through its content dependency attribute, and carrying other authentication information, such as the hash and a database pointer to a database entry storing information about the media object or the bearer of that object. One example of this approach is to invert the basic pattern only in selected locations corresponding to the signature (e.g., where the signature has a value of −1).

In yet anther implementation, the embedder embeds only the basic pattern (109), but does so using a content dependent quantization-based digital watermarking function, where the values of host signal elements are quantized into one of two sets of quantization bins, one corresponding to symbol 1 and another to symbol—1 of the binary antipodal signal. Alternatively, vector quantization may be employed in cases where the basis pattern is coded in the form of M-ary symbols. Each possible M-ary symbol corresponds to a corresponding set of quantization bins. To embed the basic pattern, the host signal values corresponding to elements in the basic pattern are quantized into the closest bin of the set corresponding to the symbol at that location in the basic pattern.

Returning generally to the process of FIG. 1, the embedder creates a digitally watermarked signal. In typical applications, this watermarked signal is rendered (e.g., printed or otherwise converted to analog form) (112). In our example of the security document, the security document is printed and distributed to the bearer. As noted above, the media object then travels through a distortion channel (114), which occurs due to its use in the intended application.

FIG. 2 is a diagram illustrating a method for authenticating media objects created using the method shown in FIG. 1. At various points in the use of the media object, there are many instances where applications demand automated verification of the object's authenticity, including whether the object itself is authentic, whether its bearer or owner is correct, etc. The layered security features implemented with the digital watermark enable such verification. In the case of secure documents, this authentication may be for access control to a place, facility, database, financial transaction, device, network system, etc. The verification process may be overt, such as where a bearer of a document is required to submit the document to a digital image scanner for verification. The verification process may also occur covertly, such as when a digital object passes through a node or gateway in a network, and is authenticated. Consider a case where the bearer of a credit card presents his credit card to a web camera to facilitate a financial transaction on the Internet. An image captured on the card can be processed at a security gateway server, where the digital image of the credit card is transmitted for digital watermark decoding and feature analysis.

As shown in FIG. 2, the process begins with a digital version of the media object 200, which is captured from its analog form or received in digital form. The specific operation varies depending on the implementation of the embedder system.

As a first example, consider the case in which both the basic pattern, W, and the content dependent watermark, CW, are embedded. In the example of secure document captured by a digital camera or scanner, there is likely to be geometric distortion and cropping. As such, the detector uses the calibration signal to synchronize with the basic pattern W. The detector then reads estimates of the basic pattern elements, W', e.g., using a reader compatible with the digital watermark embedder (202). In our implementation, the reader applies a non-linear filter compatible with the embedder to characteristics of the media signal to estimate the values of the embedded pattern, W. It then performs de-modulation and error correction decoding to recover the payload, including the embedded hash, H. An error detection message in the payload may also be used to verify that that the payload has been recovered, error-free.

After getting the payload, the reader reconstructs the pattern, W, using the same technique as in the embedder.

In another processing thread or function, the verification system calculates the media signature, S', (204) in the same manner as in the embedder. One of the benefits of using the calibration signal is that it enables the input signal to be calibrated (e.g., geometrically/temporally aligned) before the signature is calculated. This aspect of the system provides greater flexibility and reliability to the signature calculation.

Next, the system computes CW as a function of W (or W') and S' (208). The notation {CW', W' and S'} refers to the fact that these vectors may not be identical to their counterparts in the embedder. A compatible digital watermark reader then extracts estimates of CW (210) from the media object, which is preferably calibrated before extraction of CW. The degree to which CW can be extracted provides a first metric of authenticity. This measurement can be made by computing a correlation measure, and specifically, by a correlation measure between the extracted CW in block 210 and CW computed in block 208.

The measure of the content dependent pattern can be optimized by normalizing or adapting it to media signal from which it is measured. In one embodiment, the detector is programmed to normalize the measure of correlation for CW by the strength of the extracted watermark, W', detected in the media signal (e.g., the digital image scanned from a printed object being authenticated). By normalizing the measure of CW relative to the measurement of W', the verification system achieves better differentiation of authentic and fake objects. Specifically, the strength of W' can be used to set a more effective threshold for the measurement of CW in certain cases.

In the measurement of CW, there are two sources of error: 1. the error between the original and re-computed signature in the received media signal; and 2 the error in extracting the watermark CW from the received media signal. In one implementation for printed images where the embedder inserts W and CW as primary and secondary watermarks at mutually exclusive locations in the host image and at the same spatial resolution in the host image, the measurement of the strength of the primary watermark W provides a reliable predictor for the measurement of the secondary watermark. The detector uses the strength of the primary watermark to set thresholds for the measurements of the secondary watermark that specify which measurements of the secondary watermark are deemed to be attributable to an authentic object and which are attributable to a fake. The rules for setting thresholds are preferably predetermined based on empirical studies using statistical distributions of signatures from authentic and fake host signals. Experiments show that the separation between the distributions of the measurement of CW in originals and fakes gets stronger as the strength of the primary watermark gets stronger. As these distributions separate from each other, the thresholds indicating where fakes/authentic originals can be reliably distinguished widen as well. Based on tests on training sets, the implementer programmatically determines candidate thresholds for a particular value of strength of the primary watermark. Then, during operation of the verification system, the detector adapts the threshold for CW based on the strength of W by selecting the appropriate thresholds as a function of W.

Further experiments show that differentiation between originals and fakes can be enhanced in cases where there is more bandwidth for embedding CW. In images, for example, the bandwidth for CW can be increased for a fixed amount of perceptibility of the digital watermark by increasing the amount of image data in which CW is embedded. One specific example is increasing the image area over which CW is embedded. This increase can be achieved by spreading and/or repeating the CW pattern over more image samples.

In addition, separation between originals and fakes can be increased by using a longer signature. The effect of using a longer signature is that it will be embedded less redundantly in the watermark that carries the content dependent pattern. Specifically, for a fixed number of samples of the host media signal that are modified to embed CW, the redundancy of the signature decreases as the length of the signature increases.

The hash provides another layer of security. In our continuing example of a secure document, the personal information of the bearer on the secure document, generally referred to as data about media 206, is input to the same hash function used in the embedder 214, to create H'. This personal data may include name, address, date of birth, height, weight, eye color, etc. This hash is then compared with the hash extracted from W in block 216. The result is another indicator of authenticity (218), and in this example, indicates whether the personal information on the document has been altered. Even in the case where CW cannot be extracted, this measurement provides another indicator of authenticity.

The combination of the signature with the basic watermark provides an extra layer of security against photo ID card fraud, where one might attempt to copy the watermark into his own photo and then place that photo along with a copy of the personal data from the authentic card on a fraudulent photo ID card. In this scenario, even if the hash in the watermark matches the hash of the data on the card, the content signature will likely be different, and the measurement of the content dependent watermark will indicate that the photo ID is a fake.

As noted above, there are alternative implementations of the system, corresponding to the alternatives described for the embedder above. One alternative is where the basic pattern is stored or otherwise securely communicated to the verification system in a manner other than in the digital watermark carried in the media object. This may be some other machine-readable code in the secure document (e.g., 2D bar code, magnetic stripe, etc.), for example, or simply pre-programmed into the verification system.

Another implementation is where the signature, S, is used to transform (e.g., invert) selected portions of the basic pattern to create CW, without using a separate watermark to carry W. Note this transformation may involve a simple inversion of the symbols, or a more sophisticated scrambling or transform of the symbols in the base pattern corresponding to the signature elements. In this case, the verification system calculates S', and then attempts to read W, with and without the transform used to create CW. The result of these two read operations are then compared, and should be drastically different if the media signal is valid, and closer if the media signal is invalid. The degree of separation that indicates that the media is not authentic is derived through testing on training sets of valid and invalid objects. The result is a threshold test for the degree of separation between the two measurements.

Another alternative is to use an embedding and reading scheme for W that is inherently content dependent. One such example is the quantization scheme outlined above. In this type of scheme, the attributes of the embedding scheme make it difficult to extract W from one authentic document or object and insert it in another document or object without knowledge of the embedding methodology.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only, the interchanging and substitution of these teachings with other teachings in this and the incorporated-by-reference patents/applications are also contemplated.

We claim:

1. A method for creating a media object for authentication, comprising:
   computing a hash of information on the object;
   generating a pattern from the hash;
   computing a content signature from a media signal in the media object;
   combining the content signature and the pattern to form a content dependent pattern; and
   embedding the content dependent pattern as a digital watermark into the media object.

2. The method of claim 1 wherein the media object comprises a security document, and the hash is computed from information on the security document.

3. The method of claim 2 wherein the information on the security document is printed on the document.

4. The method of claim 1 wherein the media object is a card, and the information describes personal data about a bearer of the card.

5. The method of claim 1 wherein generating the pattern from the hash includes spreading the hash over a carrier signal.

6. The method of claim 5 wherein the carrier signal comprises a pseudorandom number.

7. The method of claim 1 wherein generating the pattern from the hash includes error correction encoding the hash.

8. The method of claim 1 wherein the content signature is derived from frequency domain features of the media signal.

9. The method of claim 1 wherein the media signal comprises an image, and the content signature is derived from edge features of the image.

10. The method of claim 1 wherein the content signature is derived based on filtering neighborhoods of samples within the media signal.

11. The method of claim 1 including:
    embedding the pattern and the content dependent pattern as separate digital watermarks into the media object.

12. The method of claim 11 wherein the media object comprises an image to be printed on an object, and the separate digital watermarks are embedded at different spatial image resolutions in the image.

13. The method of claim 1 wherein the content dependent pattern is combined with the pattern by transforming elements of the pattern based on the content dependent pattern.

14. The method of claim 13 wherein transforming elements comprises a pointwise multiplication.

15. The method of claim 13 wherein the transforming elements comprises selectively inverting elements of the pattern based on values of the content dependent pattern.

16. A computer readable medium on which is stores instructions for performing the method of claim 1.

17. A method of authenticating a media object using a digital watermark embedded in the media object, the method comprising:
    providing a first pattern;
    deriving a content dependent signature from a media signal in the media object;
    combining the content dependent signature and the first pattern to form a content dependent pattern; and
    measuring the content dependent pattern embedded as a digital watermark in the media signal to provide a measurement of authenticity of the media signal.

18. The method of claim 17 wherein the first pattern is computed by extracting a first digital watermark from the media signal.

19. The method of claim 18 wherein the first digital watermark carries a message payload including a hash of data about the media object, and the hash is used in a second measurement of authenticity of the media signal.

20. The method of claim 19 wherein the media object comprises a printed object and the hash of data about the media object comprises a hash of data on the printed object.

21. The method of claim 20 wherein the hash is derived from text data printed on the printed object.

22. The method of claim 18 wherein the first digital watermark and the content dependent pattern are extracted as separate digital watermarks.

23. The method of claim 18 wherein the first digital watermark includes calibration attributes used to geometrically calibrate the media signal before extracting the content dependent pattern.

24. The method of claim 17 wherein the content dependent pattern selectively transforms elements of the first pattern.

25. The method of claim 24 wherein selective transforming includes inverting elements of the first pattern.

26. The method of claim 17 wherein the first pattern is generated by extracting a digital watermark message from the media signal; performing error correction decoding of the message, and combining the message with a pseudorandom number.

27. The method of claim 17 wherein the first pattern is generated from a digital watermark extracted from the media signal, and measurement of strength of the first digital watermark is used to adapt the measurement of authenticity based on the content dependent pattern.

28. A computer readable medium on which is stored instructions for performing the method of claim 17.

29. A method of authenticating a media object using a digital watermark embedded in the media object, the method comprising:
    detecting a first digital watermark from the media object;
    extracting a multi-symbol payload from the first digital watermark;
    generating a pattern from the payload;
    combining the pattern with a content signature derived from features of the media object to form a content dependent pattern;
    detecting whether the content dependent pattern is embedded in the media object as a measure of authenticity of the media object.

30. A method for creating an identity document for authentication, the identity document comprising text information, and a portrait image, the method including:
    computing a hash based on at least certain of said text information;
    generating a pattern from the hash;
    computing a content signature based at least in part on said portrait image;
    combining the content signature and the pattern to form a content dependent pattern; and
    embedding the content dependent pattern as a digital watermark on the identity document.

* * * * *

UNITED STATES PATENT AND TRADEMARK OFFICE
CERTIFICATE OF CORRECTION

| | | |
|---|---|---|
| PATENT NO. | : 7,519,819 B2 | Page 1 of 1 |
| APPLICATION NO. | : 10/158385 | |
| DATED | : April 14, 2009 | |
| INVENTOR(S) | : Bradley et al. | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 1,314 days Delete the phrase "by 1,314 days" and insert -- by 1,523 days --

Signed and Sealed this

Fourth Day of May, 2010

David J. Kappos
*Director of the United States Patent and Trademark Office*